(12) United States Patent
Ahn et al.

(10) Patent No.: US 12,109,791 B2
(45) Date of Patent: Oct. 8, 2024

(54) DISPLAY MODULE, AND METHOD FOR MANUFACTURING THE SAME

(71) Applicant: Samsung Display Co., Ltd., Yongin-si (KR)

(72) Inventors: Seong Sik Ahn, Hwaseong-si (KR); Ah-Ram Lee, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/666,701

(22) Filed: Feb. 8, 2022

(65) Prior Publication Data

US 2022/0250347 A1 Aug. 11, 2022

(30) Foreign Application Priority Data

Feb. 10, 2021 (KR) .................. 10-2021-0018955

(51) Int. Cl.
| | | |
|---|---|---|
| B32B 3/02 | (2006.01) | |
| B32B 7/12 | (2006.01) | |
| B32B 27/08 | (2006.01) | |
| B32B 27/28 | (2006.01) | |
| B32B 27/30 | (2006.01) | |
| B32B 37/12 | (2006.01) | |
| B32B 38/00 | (2006.01) | |

(52) U.S. Cl.
CPC ............. *B32B 3/02* (2013.01); *B32B 7/12* (2013.01); *B32B 27/08* (2013.01); *B32B 27/281* (2013.01); *B32B 27/306* (2013.01); *B32B 37/12* (2013.01); *B32B 38/0004* (2013.01); *B32B 2307/4026* (2013.01); *B32B 2307/42* (2013.01); *B32B 2307/732* (2013.01); *B32B 2310/0843* (2013.01); *B32B 2457/20* (2013.01)

(58) Field of Classification Search
None
See application file for complete search history.

(56) References Cited

U.S. PATENT DOCUMENTS

| | | |
|---|---|---|
| 10,686,161 B2 | 6/2020 | Kang et al. |
| 10,901,463 B2 | 1/2021 | Yug et al. |
| 11,812,628 B2 | 11/2023 | Yug |
| 11,817,847 B2 | 11/2023 | Fukuda |
| 2018/0033834 A1* | 2/2018 | Jun ................. G06F 3/0446 |

(Continued)

FOREIGN PATENT DOCUMENTS

| | | |
|---|---|---|
| KR | 10-2017-0140491 | 12/2017 |
| KR | 10-2018-0116407 | 10/2018 |

(Continued)

*Primary Examiner* — Laura C Powers
(74) *Attorney, Agent, or Firm* — KILE PARK REED & HOUTTEMAN PLLC

(57) ABSTRACT

A display module includes a display panel including a first side surface, a first film disposed on the display panel, and including a second side surface, a second film disposed under the display panel, and including a third side surface, a first adhesive layer disposed between the display panel and the first film, and a second adhesive layer disposed between the display panel and the second film, wherein the first side surface of the display panel overlaps the first film and the second film, and at least a portion of the second side surface and at least a portion of the third side surface protrude more than the first side surface, in a plan view.

16 Claims, 16 Drawing Sheets

(56) References Cited

U.S. PATENT DOCUMENTS

2021/0318718 A1    10/2021  Ahn et al.
2022/0164045 A1*    5/2022  Kishimoto ............. C09J 183/04

FOREIGN PATENT DOCUMENTS

| KR | 20190006161 A * | 1/2019 | |
|----|---|---|---|
| KR | 10-2019-0062667 | 6/2019 | |
| KR | 10-2019-0136142 | 12/2019 | |
| KR | 10-2020-0133099 | 11/2020 | |
| KR | 10-2021-0125636 | 10/2021 | |
| WO | WO-2014175463 A1 * | 10/2014 | ............. B32B 17/06 |

* cited by examiner

DISPLAY MODULE, AND METHOD FOR MANUFACTURING THE SAME

CROSS-REFERENCE TO RELATED APPLICATION(S)

This U.S. non-provisional patent application claims priority to and the benefit of Korean Patent Application No. 10-2021-0018955 under 35 U.S.C. § 119, filed in the Korean Intellectual Property Office (KIPO) on Feb. 10, 2021, the entire contents of which are incorporated herein by reference.

BACKGROUND

The disclosure herein relates to a display module, and a method for manufacturing the display module, and more particularly, to a display module having improved product reliability, and a method for manufacturing the display module to provide the same.

A display device may include a display module. The display module may be provided as being cut from a preliminary display module that is separated from a mother substrate. A laser may be used to cut the preliminary display module.

SUMMARY

The disclosure provides a display module having improved product reliability.

The disclosure also provides a display module manufacturing method for embodying a display module having improved product reliability.

An embodiment of the disclosure provides a display module including a display panel including a first side surface; a first film disposed on the display panel, and including a second side surface; a second film disposed under the display panel, and including a third side surface; a first adhesive layer disposed between the display panel and the first film; and a second adhesive layer disposed between the display panel and the second film. The first side surface of the display panel overlaps the first film and the second film, and at least a portion of the second side surface and at least a portion of the third side surface may protrude more than the first side surface, in a plan view.

In an embodiment, the first side surface of the display panel, the second side surface of the first film, and the third side surface of the second film may be parallel to each other in a thickness direction of the display panel.

In an embodiment, a side surface of the first adhesive layer and a side surface of the second adhesive layer may have a shape inclined with respect to the thickness direction of the display panel.

In an embodiment, the second side surface of the first film and a side surface of the first adhesive layer may be connected to each other to have a continuous shape, and the third side surface of the second film and a side surface of the second adhesive layer may be connected to each other to have a continuous shape.

In an embodiment, a maximum width between the first side surface of the display panel and the second side surface of the first film may be at least about ¼ times the thickness of the display panel, in a plan view.

In an embodiment, an entire side surface of the display panel may overlap the first film and the second film, in a plan view.

In an embodiment, a portion of a side surface of the display panel may overlap the first film and the second film, in a plan view, and another portion of a side surface of the display panel may be aligned with a portion of a side surface of the first film and a portion of a side surface of the second film, in a plan view.

In an embodiment, an inclination of the second side surface of the first film with respect to the first side surface of the display panel may be constant, and an inclination of the third side surface of the second film with respect to the first side surface of the display panel may be constant.

In an embodiment, an inclination of the second side surface of the first film with respect to the first side surface of the display panel varies depending on a position in the second side surface, and an inclination of the third side surface of the second film with respect to the first side surface of the display panel may vary depending on a position in the third side surface.

An embodiment of the disclosure provides a method for manufacturing a display module, including: preparing a preliminary display module including a first protective film, a first film, a display panel, a second film, and a second protective film are sequentially stacked; forming a first preliminary side surface on the preliminary display module; forming a second preliminary side surface on the preliminary display module; and forming a display module by removing the first protective film and the second protective film. At least a portion of the first film and at least a portion of the second film protrude more than the display panel, in a plan view.

In an embodiment, the forming of the first preliminary side surface may include disposing the preliminary display module in a temperature different from a room temperature; irradiating the preliminary display module with a laser beam; and cutting the preliminary display module to form the first preliminary side surface.

In an embodiment, the forming of the second preliminary side surface may include: disposing the preliminary display module after the forming of the first preliminary side surface; and deforming a shape of the first preliminary side surface to form the second preliminary side surface.

In an embodiment, the forming of the first preliminary side surface may include: irradiating with a first laser beam in a direction inclined with respect to a thickness direction of the display module and in a direction towards the display panel from the first protective film; and cutting a portion in a thickness direction of the preliminary display module to form the first preliminary side surface.

In an embodiment, the forming of the second preliminary side surface may include irradiating with a second laser beam in a direction inclined with respect to the thickness direction of the display module and in a direction towards the display panel from the second protective film; and cutting a portion in the thickness direction of the preliminary display module to form the second preliminary side surface.

In an embodiment, the forming of the first preliminary side surface and the forming of the second preliminary side surface may each include irradiating with a laser beam in the thickness direction of the display module to form the first preliminary side surface and the second preliminary side surface.

In an embodiment, at least one of the first protective film and the first film may include a material that defocuses a focal point of the laser beam, and at least one of the second film and the second protective film may include a material that focuses the focal point of the laser beam.

An embodiment of the disclosure provides a display module including: a display panel including a first side surface; a first film disposed on the display panel, and including a second side surface; and a second film disposed under the display panel, and including a third side surface. At least one of the second side surface of the first film and the third side surface of the second film may protrude more by a protruding width than the first side surface of the display panel, and the protruding width may be about ¼ to about 3 times a thickness of the display panel.

In an embodiment, the display module may further include: a first adhesive layer disposed between the display panel and the first film; and a second adhesive layer disposed between the display panel and the second film. The first side surface of the display panel, the second side surface of the first film, and the third side surface of the second film may be parallel to each other in the thickness direction of the display panel, and a side surface of the first adhesive layer and a side surface of the second adhesive layer may each have a shape inclined with respect to the thickness direction of the display panel.

In an embodiment, an entire side surface of the display panel may overlap both the first film and the second film, in a plan view.

In an embodiment, a portion of a side surface of the display panel may overlap the first film and the second film, in a plan view, and another portion of a side surface of the display panel may be aligned with a portion of a side surface of the first film and a portion of a side surface of the second film, in a plan view.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain principles of the disclosure. In the drawings.

DETAILED DESCRIPTION OF THE EMBODIMENTS

Figure 1:
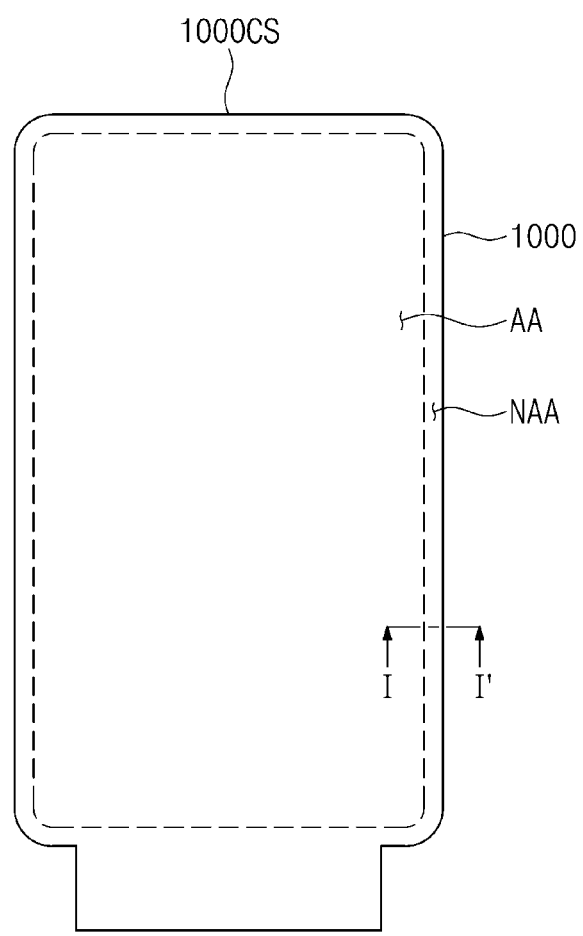
FIG. 1 is a schematic plan view of a display module according to an embodiment of the disclosure.

In the specification, when an element (or a region, a layer, a portion, etc.) is referred to as being "on," "connected to," or "coupled to" another element, it means that the element may be directly disposed on, connected to, or coupled to the other element, or that a third element may be disposed therebetween.

Like reference numerals refer to like elements. Also, in the drawings, the thickness, the ratio, and the dimensions of elements are exaggerated for an effective description of technical contents. The term "and/or" includes all combinations of one or more of which associated configurations may define.

It will be understood that, although the terms first, second, and the like may be used herein to describe various elements, these elements should not be limited by these terms. These terms are only used to distinguish one element from another. For example, a first element could be termed a second element, and, similarly, a second element could be termed a first element, without departing from the scope of example embodiments of the disclosure. The terms of a singular form may include plural meanings unless the context clearly indicates otherwise.

In addition, terms such as "below," "lower," "above," and "upper" are used to describe the relationship between components shown in the drawings. The terms are relative concepts and are described based on the directions indicated in the drawings.

It should be understood that the terms "comprise" or "have" are intended to specify the presence of stated features, integers, processes, operations, elements, components, or combinations thereof in the disclosure, but do not preclude the presence or addition of one or more other features, integers, processes, operations, elements, components, or combinations thereof.

The phrase "at least one of" is intended to include the meaning of "at least one selected from the group of" for the purpose of its meaning and interpretation. For example, "at least one of A and B" may be understood to mean "A, B, or A and B."

Unless otherwise defined or implied herein, all terms (including technical and scientific terms) used herein have the same meaning as commonly understood by one of ordinary skill in the art to which the disclosure pertains. It is also to be understood that terms, such as those defined in commonly used dictionaries, should be interpreted as having meanings consistent with the meanings in the context of the related art and the disclosure, and should not be interpreted in an ideal or excessively formal sense unless clearly so defined herein.

Hereinafter, embodiments of the disclosure will be described with reference to the accompanying drawings.

FIG. 1 is a schematic plan view of a display module according to an embodiment.

Referring to FIG. 1, an active area AA and a peripheral area NAA may be defined in a display module 1000. The active area AA may be an area activated in response to an electrical signal. A driving circuit, a driving line or the like for driving the active area AA may be disposed in the peripheral area NAA.

The active area AA of the display module 1000 may include a plane defined by a first direction DR1 and a second direction DR2. A thickness direction of the display module 1000 may be parallel to a third direction DR3 intersecting the first direction DR1 and the second direction DR2. Accordingly, a front surface (or an upper surface) and a rear surface (or a lower surface) of each of members constituting the display module 1000 may be defined based on the third direction DR3. In the specification, the wording "when viewed in a plane" or "in a plan view" may be interpreted as being viewed in the thickness direction of the display module 1000 or as being viewed in the third direction DR3.

Figure 2:
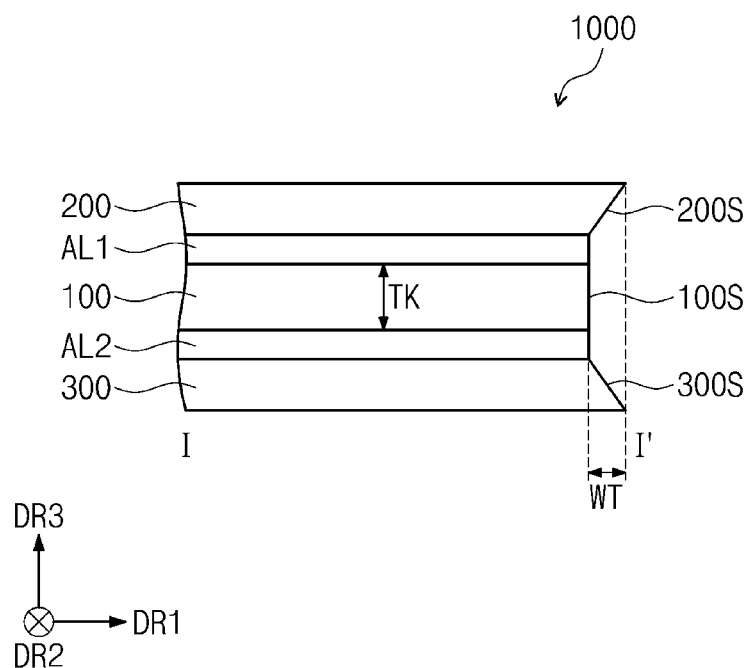
FIG. 2 is a schematic cross-sectional view taken along line I-I' illustrated in FIG. 1, according to an embodiment of the disclosure.

FIG. 2 is a schematic cross-sectional view taken along line I-I' illustrated in FIG. 1 according to an embodiment.

Referring to FIG. 2, the display module 1000 may include a display panel 100, a first film 200, a second film 300, a first adhesive layer AL1, and a second adhesive layer AL2. The first film 200, the first adhesive layer AL1, the display panel 100, the second adhesive layer AL2, and the second film 300 may be sequentially stacked.

The display panel 100 may have a configuration that substantially generates an image. The display panel 100 may be a light-emitting type display panel. For example, the display panel 100 may be an organic light-emitting display panel, a quantum dot light-emitting display panel, or a micro-LED display panel.

The display panel 100 may further include an input sensor that senses an external input applied from the outside. The external input may be a user input. The user input may include various forms of external inputs such as a portion of a user's body, light, heat, a pen, or pressure.

For example, the display panel 100 may include a display layer and a sensor layer. The sensor layer may be formed on the display layer by a series of processes. In this case, the sensor layer may be expressed as being directly disposed on the display layer. Being directly disposed may mean that a third component is not disposed between the sensor layer and the display layer. For example, a separate adhesive member may not be disposed between the sensor layer and the display layer.

As another example, the display panel 100 may include a display layer, an adhesive layer, and a sensor layer. In this case, the sensor layer may be coupled or connected by the display layer and the adhesive layer.

The first film 200 may be disposed on the display panel 100. The first film 200 may be a polarizing film. The first film 200 may reduce the reflectance of external light incident from the outside. The first film 200 may include a stretchable synthetic resin film. For example, the first film 200 may be provided by dyeing a polyvinyl alcohol film (PVA film) with an iodine compound.

The second film 300 may be disposed under the display panel 100. The second film 300 may be referred to as a protective film or a pattern film. The second film 300 may protect a rear surface of the display panel 100. The second film 300 may prevent scratches from occurring on the rear surface of the display panel 100. The second film 300 may be a colored polyimide film. For example, the second film 300 may be an opaque yellow film, but is not limited thereto.

The first adhesive layer AL1 is disposed between the display panel 100 and the first film 200, and the first adhesive layer AL1 may be attached to the display panel 100 and the first film 200. The second adhesive layer AL2 is disposed between the display panel 100 and the second film 300, and the second adhesive layer AL2 may be attached to the display panel 100 and the second film 300. The first adhesive layer AL1 and the second adhesive layer AL2 may be a pressure sensitive adhesive (PSA) film or an optically clear adhesive (OCA), but are not particularly limited thereto.

A first side surface 100S of the display panel 100 may protrude less than a second side surface 200S of the first film 200 and a third side surface 300S of the second film 300. Accordingly, in a plan view (i.e., when viewed in the thickness direction of the display panel 100, for example, in the third direction DR3), the first side surface 100S of the display panel 100 may overlap the first film 200 and the second film 300. For example, when viewed in the thickness direction of the display panel 100, a portion of the first film 200 and a portion of the second film 300 may not overlap the display panel 100.

The second side surface 200S of the first film 200 and the third side surface 300S of the second film 300 may each extend in a direction inclined with respect to the first side surface 100S of the display panel 100.

An inclination of the second side surface 200S of the first film 200 with respect to the first side surface 100S of the display panel 100 and an inclination of the third side surface 300S of the second film 300 with respect to the first side surface 100S of the display panel 100, may be each constant. Accordingly, on a cross-section, the second side surface 200S of the first film 200 and the third side surface 300S of the second film 300 may be composed of straight lines.

Degrees of protrusion of the first film 200 and the second film 300 may be determined in consideration of the thickness of the display panel 100 and remaining space of a housing or case to which the display module 1000 is coupled.

When viewed in the thickness direction of the display panel 100, a maximum width WT between the side surface 100S of the display panel 100 and the second side surface 200S of the first film 200, and a maximum width WT between the first side surface 100S of the display panel 100 and the third side surface 300S of the second film 300 may each be about ¼ to about 3 times a thickness TK of the display panel 100. Assuming that the thickness TK of the display panel 100 is about 40 micrometers, the maximum width WT may be about 10 micrometers to about 120 micrometers. For example, in case that the maximum width WT is less than about 10 micrometers, the display panel 100 may not be sufficiently protected by the first film 200 and the second film 300. The upper limit value of the maximum width WT is not limited to the abovementioned numerical examples, and the upper limit of the maximum width WT may be expanded as much as possible in consideration of remaining space of a housing or case to which the display module 1000 is coupled. The maximum width WT may be referred to as a protruding width.

According to an embodiment, since an external impact is primarily absorbed by the first film 200 or the second film 300 protruding more than the display panel 100, a possibility that an external impact is directly transmitted to the display panel 100 may be lowered. For example, the display panel 100 may have a structure that is robust against an external impact, and a phenomenon, in which a defective pixel area visually recognized as a dark spot is gradually expanded, may be reduced or prevented.

Figure 3:
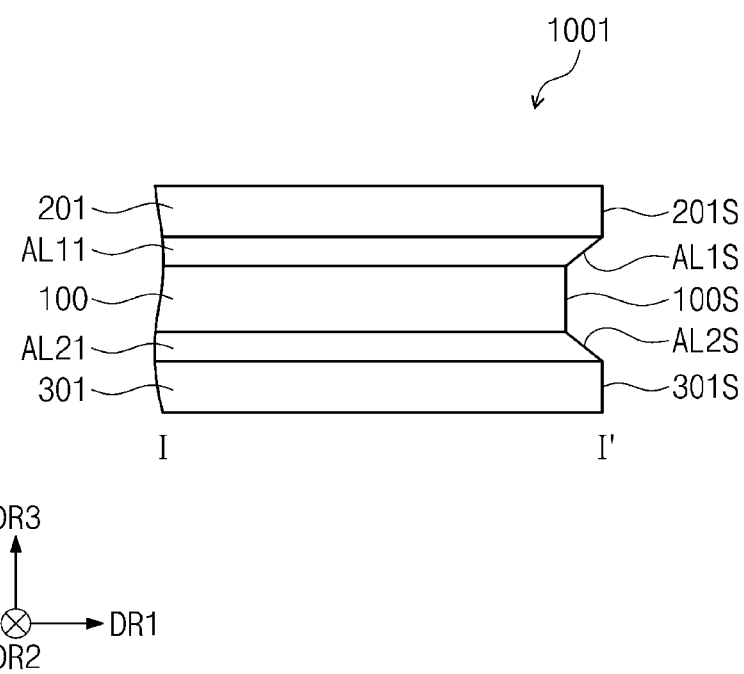
FIG. 3 is a schematic cross-sectional view taken along line I-I' illustrated in FIG. 1, according to an embodiment of the disclosure.

FIG. 3 is a schematic cross-sectional view taken along line I-I' illustrated in FIG. 1, according to an embodiment.

Referring to FIG. 3, a display module 1001 may include a display panel 100, a first film 201, a second film 301, a first adhesive layer AL11, and a second adhesive layer AL21.

A second side surface 201S of the first film 201 and a third side surface 301S of the second film 301 may protrude more than a first side surface 100S of the display panel 100. Accordingly, the display panel 100 may have a structure that is robust against an external impact.

When viewed in the thickness direction of the display panel 100, for example, in a third direction DR3, the first side surface 100S of the display panel 100 may overlap the first film 201 and the second film 301. Accordingly, a portion of the first film 201 and a portion of the second film 301 may not overlap the display panel 100.

The first side surface 100S of the display panel 100, the second side surface 201S of the first film 201, and the third side surface 301S of the second film 301 may be parallel to a predetermined direction. For example, the first side surface 100S of the display panel 100, the second side surface 201S of the first film 201, and the third side surface 301S of the second film 301 may be parallel to the thickness direction of the display panel 100, for example, to a third direction DR3.

When viewed in the third direction DR3, the first side surface 100S of the display panel 100 may be separated from both the second side surface 201S of the first film 201 and the third side surface 301S of the second film 301.

A side surface AL1S of the first adhesive layer AL11 and a side surface AL2S of the second adhesive layer AL21 may have a shape inclined with respect to the thickness direction DR3 of the display panel 100. For example, the side surface AL1S of the first adhesive layer AL11 may extend in a direction away from an upper surface of the display panel 100, and the side surface AL2S of the second adhesive layer AL21 may extend in a direction away from a lower surface of the display panel 100.

According to an embodiment, since an external impact is primarily absorbed by the first film 201 or the second film 301 protruding more than the display panel 100, a possibility that an external impact is directly transmitted to the display panel 100 may be lowered. For example, the display panel 100 may have a structure that is robust against an external impact, and a phenomenon, in which a defective pixel area visually recognized as a dark spot is gradually expanded, may be reduced or prevented.

Figure 4:
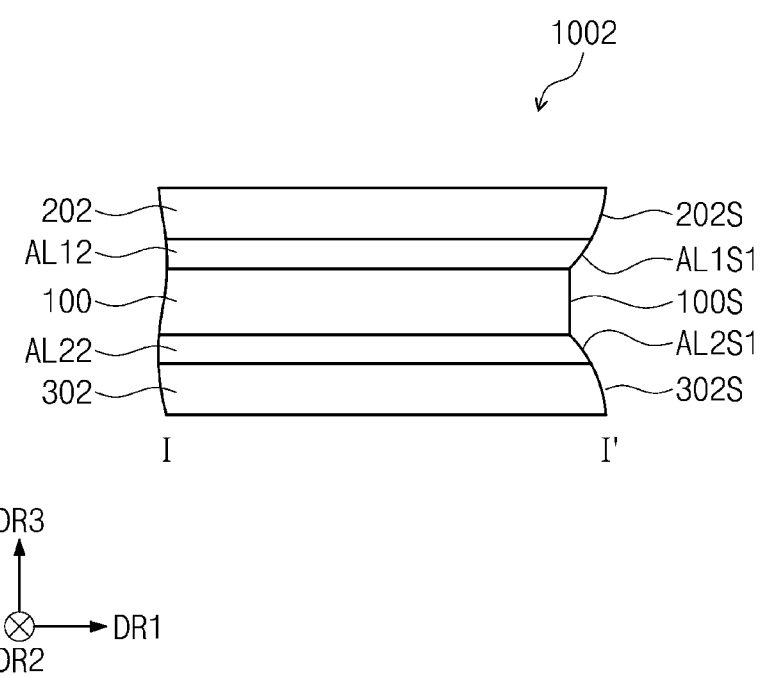
FIG. 4 is a schematic cross-sectional view taken along line I-I' illustrated in FIG. 1, according to an embodiment of the disclosure.

FIG. 4 is a schematic cross-sectional view taken along line I-I' illustrated in FIG. 1, according to an embodiment.

Referring to FIG. 4, a display module 1002 may include a display panel 100, a first film 202, a second film 302, a first adhesive layer AL12, and a second adhesive layer AL22. A second side surface 202S of the first film 202 and a third side surface 302S of the second film 302 may protrude more than a first side surface 100S of the display panel 100. Accordingly, the display panel 100 may have a structure that is robust against an external impact.

The second side surface 202S of the first film 202 and a side surface AL1S1 of the first adhesive layer AL12 may be connected to each other to have a continuous shape. The third side surface 302S of the second film 302 and a side surface AL2S1 of the second adhesive layer AL22 may be connected to each other to have a continuous shape. In a cross-sectional view, for example, the first film 202 and the first adhesive layer AL12 may be aligned such that the side surfaces thereof 202S and AL1S1 may form a curved line, and the second film 302 and the second adhesive layer AL22 may be aligned such that the side surfaces thereof 302S and AL2S1 may form a curved line.

An inclination of the second side surface 202S of the first film 202 with respect to the first side surface 100S of the display panel 100 may vary depending on a position in the second side surface 202S. An inclination of the third side surface 302S of the second film 302 with respect to the first side surface 100S of the display panel 100 may vary depending on a position in the third side surface 302S. Accordingly, on a cross-section, the second side surface 202S of the first film 202 and the third side surface 302S of the second film 302 may be composed of curved lines.

Figure 5A:
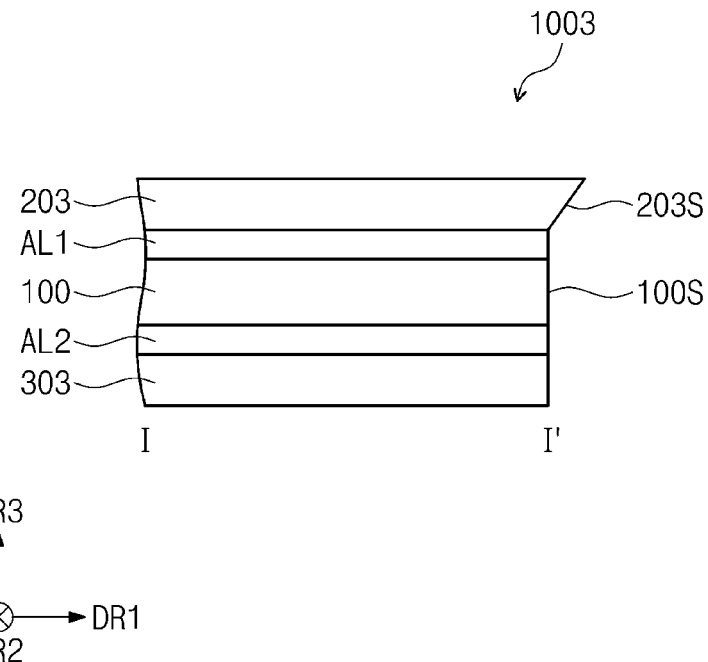
FIG. 5A is a schematic cross-sectional view taken along line I-I' illustrated in FIG. 1, according to an embodiment of the disclosure.

FIG. 5A is a schematic cross-sectional view taken along line I-I' illustrated in FIG. 1, according to an embodiment.

Referring to FIG. 5A, a display module 1003 may include a display panel 100, a first film 203, a second film 303, a first adhesive layer ALL and a second adhesive layer AL2. A second side surface 203S of the first film 203 may protrude more than a first side surface 100S of the display panel 100. Accordingly, the first side surface 100S of the display panel 100 may have a structure that is robust against an external impact.

On a cross-section, an extension direction of the first side surface 100S of the display panel 100 may be parallel to a thickness direction of the display panel 100, for example, to a third direction DR3. On the cross-section, an extension direction of the second side surface 203S of the first film 203 may be different from the extension direction of the first side surface 100S of the display panel 100.

Figure 5B:
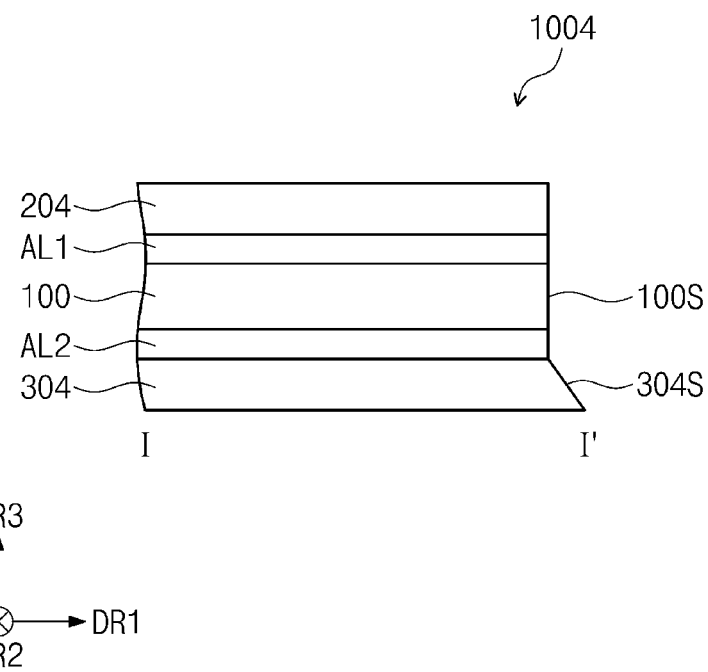
FIG. 5B is a schematic cross-sectional view taken along line I-I' illustrated in FIG. 1, according to an embodiment of the disclosure.

FIG. 5B is a schematic cross-sectional view taken along line I-I' illustrated in FIG. 1, according to an embodiment.

Referring to FIG. 5B, a display module 1004 may include a display panel 100, a first film 204, a second film 304, a first adhesive layer ALL and a second adhesive layer AL2. A side surface 304S of the second film 304 may protrude more than a first side surface 100S of the display panel 100. Accordingly, the display panel 100 may have a structure that is robust against an external impact.

On a cross-section, an extension direction of the first side surface 100S of the display panel 100 may be parallel to a thickness direction of the display panel 100, for example, to a third direction DR3. On the cross-section, an extension direction of the side surface 304S of the second film 304 may be different from the extension direction of the first side surface 100S of the display panel 100.

Figure 6A:
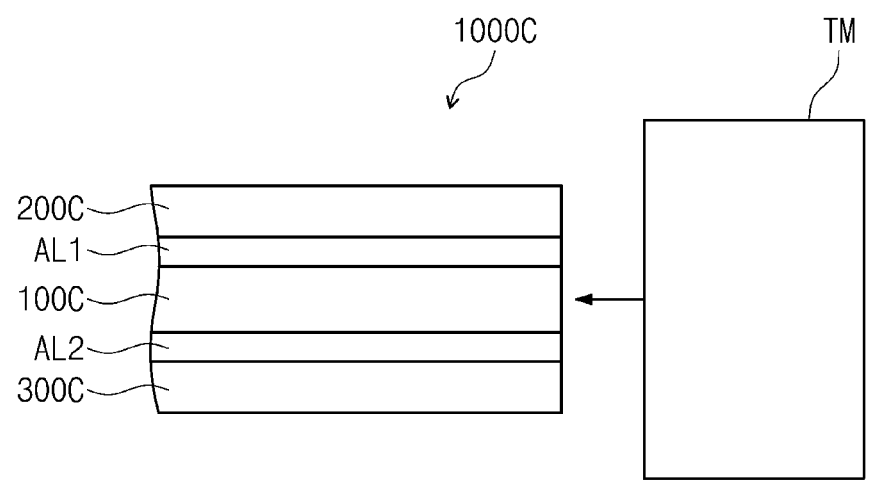
FIG. 6A to FIG. 6C are schematic views illustrating testing of display modules.
Figure 6B:
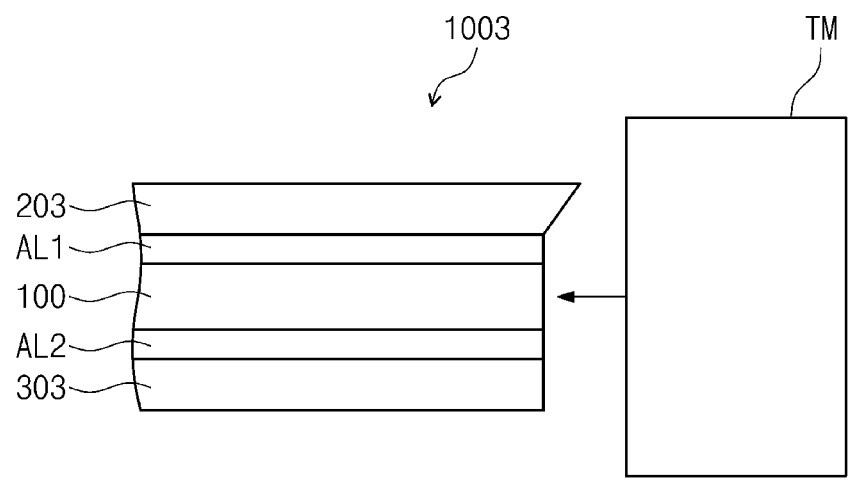
Figure 6C:
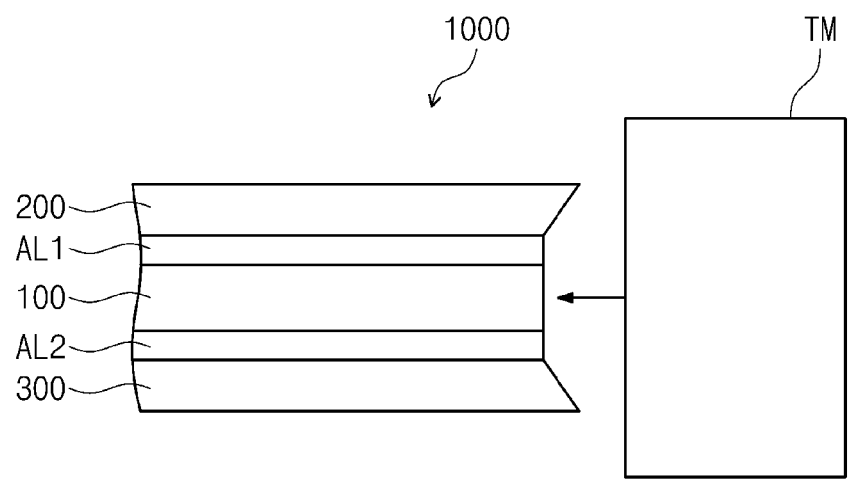

FIGS. 6A to 6C are schematic views illustrating testing of display modules.

Referring to FIGS. 6A to 6C, an impact may be applied to display modules 1000C, 1003, and 1000 by using an impact generating unit TM. An external impact may be provided by the impact generating unit TM. For example, the impact generating unit TM may apply an impact to the display modules 1000C, 1003, and 1000 at a speed of about 0.2 m/sec.

Referring to FIG. 6A, a comparative display module 1000C is illustrated. The comparative display module 1000C may include a display panel 100C, a first film 200C, a second film 300C, a first adhesive layer ALL and a second adhesive layer AL2. Side surfaces of the display panel 100, the first film 200C, the second film 300C, the first adhesive layer ALL and the second adhesive layer AL2 may be aligned on the same plane. In this case, in case that an impact was applied to the comparative display module 1000C by using the impact generating unit TM, a maximum stress generated on the display panel 100C was measured to be about 4.436 MPa.

Referring to FIG. 6B, the impact generating unit TM may first contact a first film 203 protruding more than a display panel 100, and an external impact may be primarily absorbed by a first film 203. In this case, a maximum stress generated in the display panel 100 was measured to be about 2.530 MPa. When compared with a case in which side surfaces of components of the comparative display module 1000C are all aligned, it can be seen that the maximum stress is reduced to a level of about 57 percent.

Referring to FIG. 6C, the impact generating unit TM may first contact a first film 200 and a second film 300 protruding more than a display panel 100. Accordingly, an external impact may be primarily absorbed by the first and second films 200 and 300. In this case, a maximum stress generated in the display panel 100 was measured to be about 1.217 MPa. When compared with a case in which side surfaces of components of a comparative display module 1000C are all aligned, it can be seen that the maximum stress is reduced to a level of about 27 percent.

In case that a structure protruding more than the side surface of the display panel 100 is applied to at least one of the first film or the second film, the display panel 100 may have a structure that is robust against an external impact. Accordingly, a possibility that a crack occurs on an edge portion of the display panel 100 due to an external impact may be lowered, and as a result, a defect that may be caused by the crack, for example, a phenomenon, in which a defective pixel area visually recognized as a dark spot is gradually expanded, may be reduced or prevented.

Figure 7A:
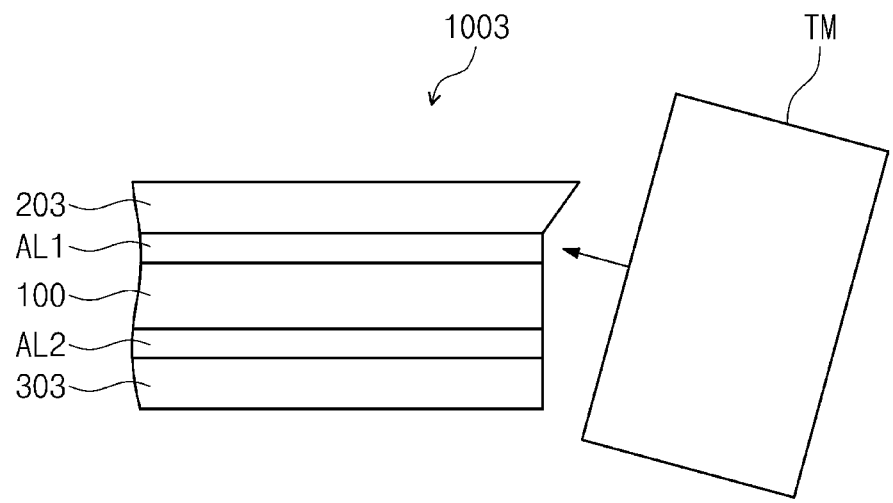
FIG. 7A and FIG. 7B are schematic views illustrating testing of display modules.
Figure 7B:
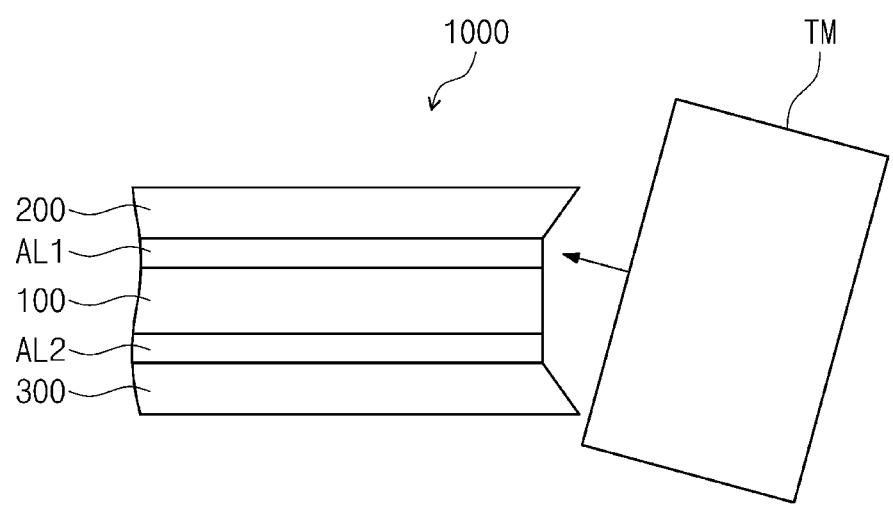

FIGS. 7A and 7B are schematic views illustrating testing of display modules.

Referring to FIGS. 7A and 7B, an impact may be applied to display modules 1003 and 1000 by using an impact generating unit TM. These are for investigating an impact, for example, a tilt impact, in case that the display modules 1003 and 1000 are dropped while being tilted, and an angle at which the impact is applied to the display modules 1003 and 1000 by the impact generating unit TM is different from those described previously with reference to FIGS. 6A and 6B.

Referring to FIG. 7A, in a structure in which a film disposed on a side of a display panel 100 protrudes, for example, only a first film 203 protrudes, a maximum stress generated in the display panel 100 was measured to be about 1.995 MPa.

Referring to FIG. 7B, in a structure in which both a first film 200 and a second film 300 disposed on both sides of the display panel 100 protrude, a maximum stress generated in the display panel 100 was measured to be about 1.158 MPa. When compared with the structure in which only the film disposed on the one side of the display panel 100 protrudes, it can be seen that the maximum stress is reduced to a level of about 58 percent.

Figure 8:
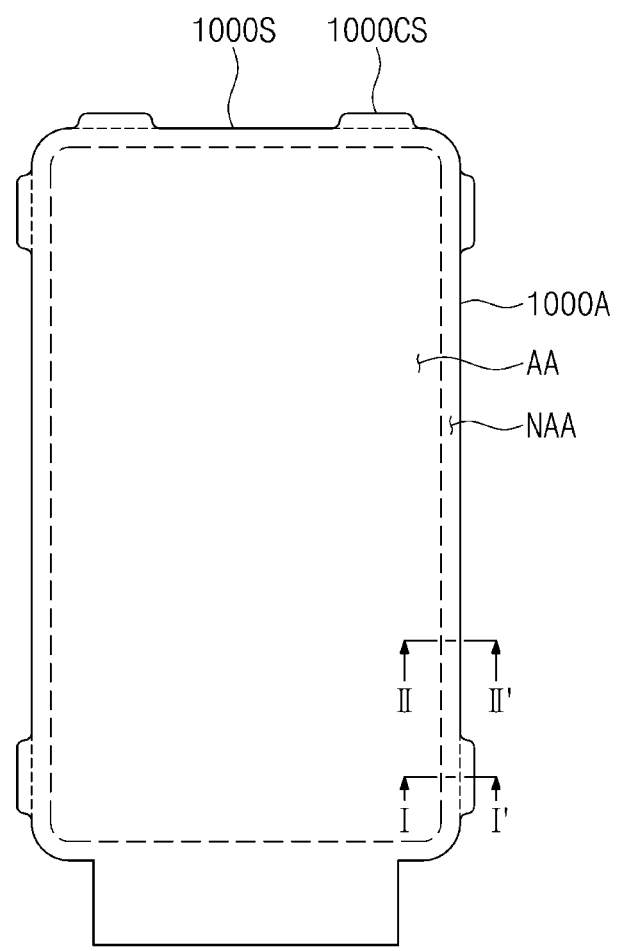
FIG. 8 is a schematic plan view of a display module according to an embodiment of the disclosure.
Figure 9:
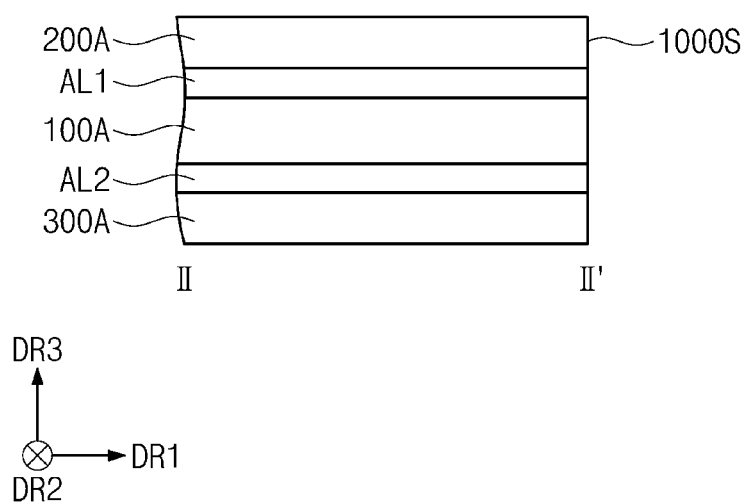
FIG. 9 is a schematic cross-sectional view taken along line II-II' illustrated in FIG. 8, according to an embodiment of the disclosure.

FIG. 8 is a schematic plan view of a display module according to an embodiment. FIG. 9 is a schematic cross-sectional view taken along line II-IF illustrated in FIG. 8, according to an embodiment.

Referring to FIG. 8, an active area AA and a peripheral area NAA may be defined in a display module 1000A. A side surface of the display module 1000A may include a first side surface portion 1000CS and a second side surface portion 10005.

The first side surface portion 1000CS may have a cross-sectional structure described with reference to FIG. 2, 3, 4, 5A, or 5B, and in the second side surface portion 10005, a display panel 100A, a first film 200A, and a second film 300A may be aligned as illustrated in FIG. 9.

For example, the display module 1000 (see FIG. 1) illustrated in FIG. 1 may have a structure in which an entire side surface of the display panel 100 (see FIG. 2) overlaps the first film 200 (see FIG. 2) and the second film 300 (see FIG. 2). In the display module 1000A illustrated in FIG. 8, a portion of a side surface of the display panel 100A may overlap at least one of the first film 200A or the second film 300A, and another portion of the side surface of the display panel 100A may be aligned with the first film 200A and the second film 300A as illustrated in FIG. 9. In other words, a portion of the side surface of the display panel 100A of the first side surface portion 1000CS may overlap at least one of the first film 200A or the second film 300A, and another portion of the side surface of the display panel 100A of the second side surface portion 10005 may be aligned with the side surface of the first film 200A and the side surface of the second film 300A.

The first side surface portion 1000CS may be referred to as a protruding portion or a protective portion. The first side surface portion 1000CS may be provided in plurality. For example, the first side surface portion 1000CS has a compensatory structure that allows the display panel 100A to be robust against an external impact, and may thus be provided on a portion vulnerable to an impact. For example, the first side surface portion 1000CS may be provided on a portion corresponding to a protruding portion of a tray moving the display module 1000A. Although FIG. 8 illustrates that a total of six first side surface portions 1000CS are provided, the embodiment is not limited thereto. Therefore, the number of the first side surface portion 1000CS and the length of the first side surface portion 1000CS may be variously modified.

Figure 10:
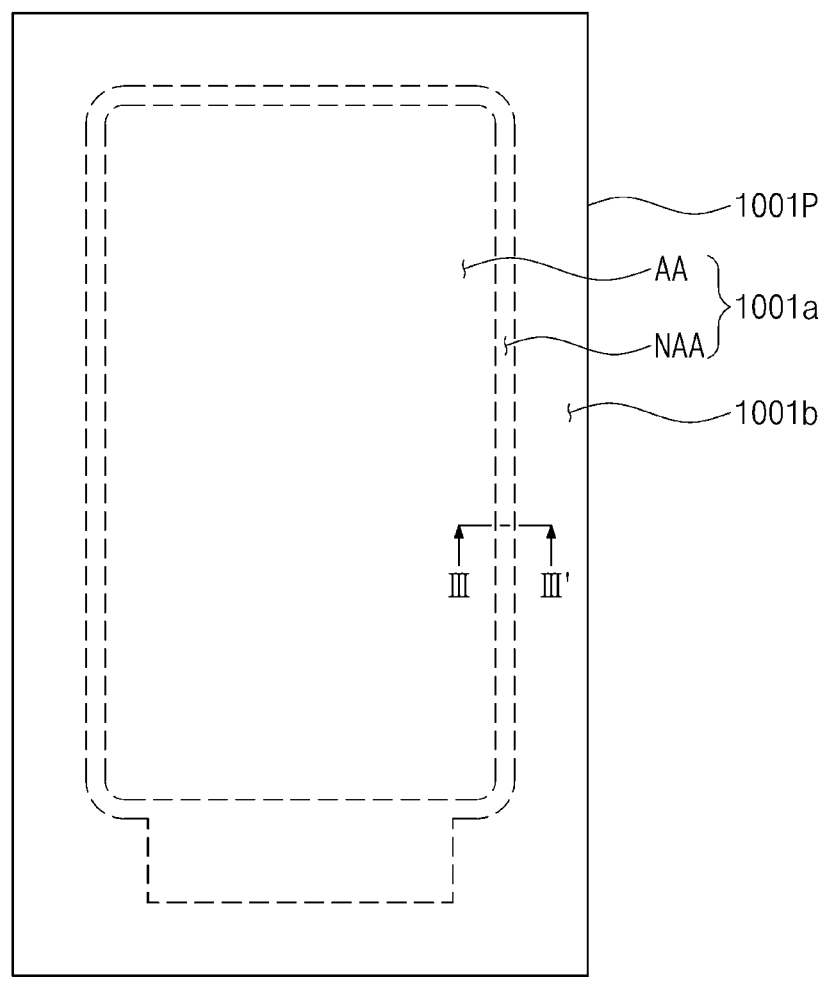
FIG. 10 is a schematic plan view of a preliminary display module according to an embodiment of the disclosure.

FIG. 10 is a schematic plan view of a preliminary display module according to an embodiment.

Referring to FIG. 10, a preliminary display module 1001P is prepared. The preliminary display module 1001P may include an effective area 1001a and a non-effective area 1001b. The effective area 1001a may be an area corresponding to the display module 1000 (see FIG. 1). The non-effective area 1001b may correspond to an area removed by a cutting process.

Figure 11A:
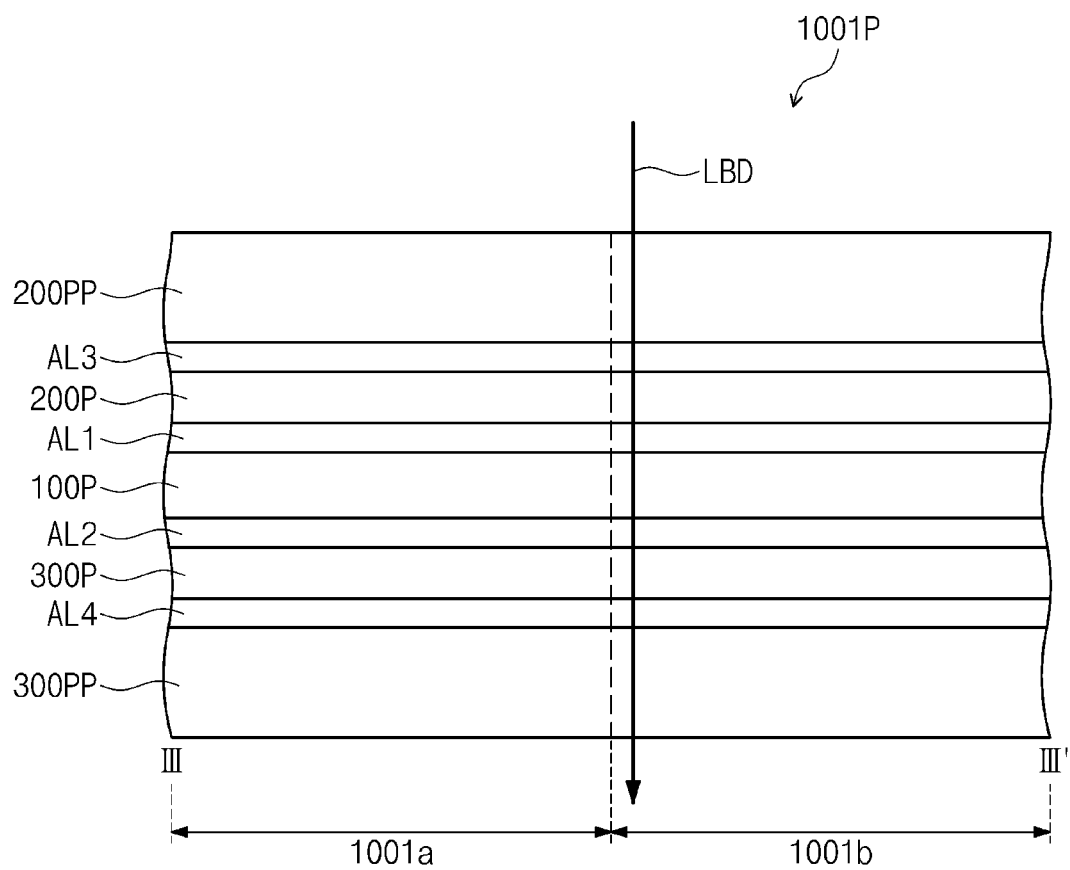
FIG. 11A to FIG. 11C are schematic views illustrating a method for manufacturing a display module according to an embodiment of the disclosure.
Figure 11B:
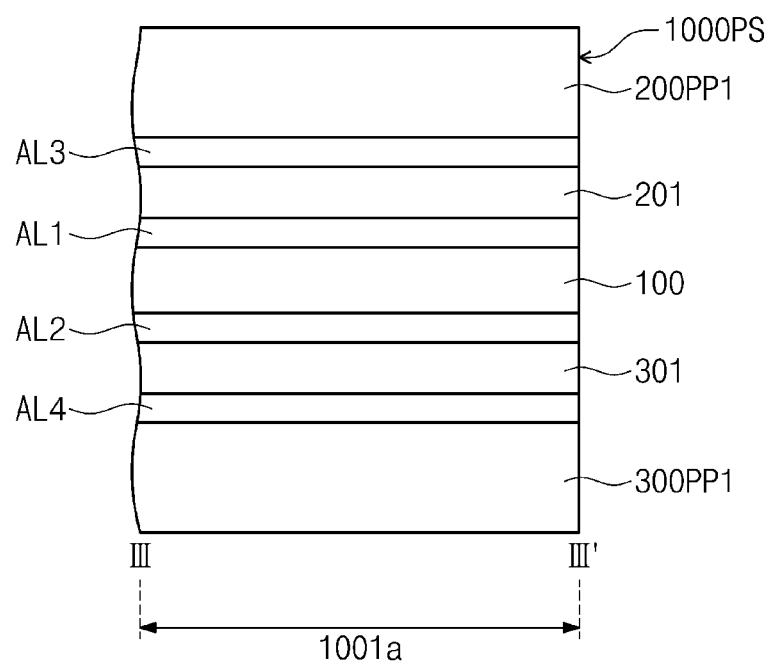
Figure 11C:
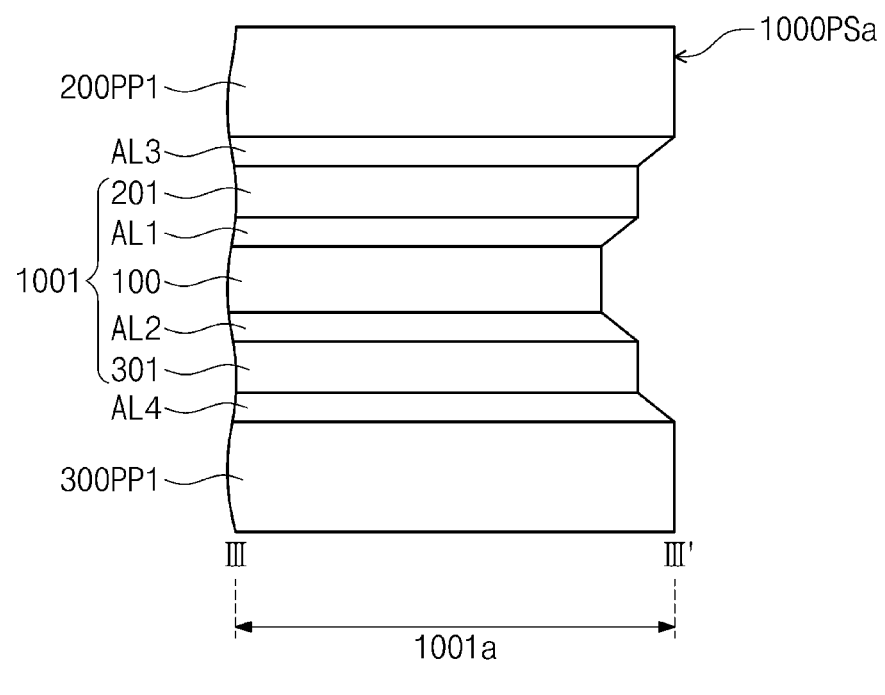

FIGS. 11A to 11C are schematic views illustrating a method for manufacturing a display module according to an embodiment.

Referring to FIG. 11A, the preliminary display module 1001P may include a first protective film 200PP, a first film 200P, a display panel 100P, a second film 300P, and a second protective film 300PP which are sequentially stacked. A third adhesive layer AL3 may be disposed between the first protective film 200PP and the first film 200P, and a fourth adhesive layer AL4 may be disposed between the second film 300P and the second protective film 300PP.

Referring to FIG. 11A, the preliminary display module 1001P is disposed in an environment of a temperature different from room temperature. For example, the preliminary display module 1001P may be disposed in an environment of a temperature higher than room temperature or lower than room temperature. Then, the preliminary display module 1001P may be irradiated with a laser beam LBD. The laser beam LBD may be irradiated in a direction parallel to a thickness direction of the display module 1001. The temperature difference between the room temperature and the temperature of the environment in which the laser beam LBD is irradiated, may be about 20 degrees Celsius, but is not particularly limited thereto.

Referring to FIGS. 11A and 11B, the preliminary display module 1001P is cut to form a first preliminary side surface 1000PS. The first preliminary side surface 1000PS may be defined in such a manner that side surfaces of the first protective film 200PP1, the first film 201, the display panel 100, the second film 301, and the second protective film 300PP1 are connected to each other.

Referring to FIGS. 11B and 11C, the preliminary display module 1001P in which the first preliminary side surface 1000PS is formed is disposed at room temperature. In this case, the display panel 100, the first film 201, and the second film 301 may have different coefficients of thermal expansion. For example, the coefficient of thermal expansion of the display panel 100 may be about 7.6 ppm (parts per million), and the coefficient of thermal expansion of a polyethylene terephthalate (PET) film may be about 70 ppm. Accordingly, the shape of the first preliminary side surface 1000PS may be deformed because of the different coefficients of thermal expansion to form a second preliminary side surface 1000PSa.

The first and second protective films 200PP1 and 300PP1 may serve to protect the display panel 100 while the display module 1001 is moved. Since the side surfaces of the first and second protective films 200PP1 and 300PP1 also protrude more than the display panel 100, it is possible to prevent an external impact from being directly transmitted to an edge portion of the display panel 100. Then, in a subsequent process, the first protective film 200PP1 and the second protective film 300PP1 are removed to form the display module 1001.

Figure 12A:
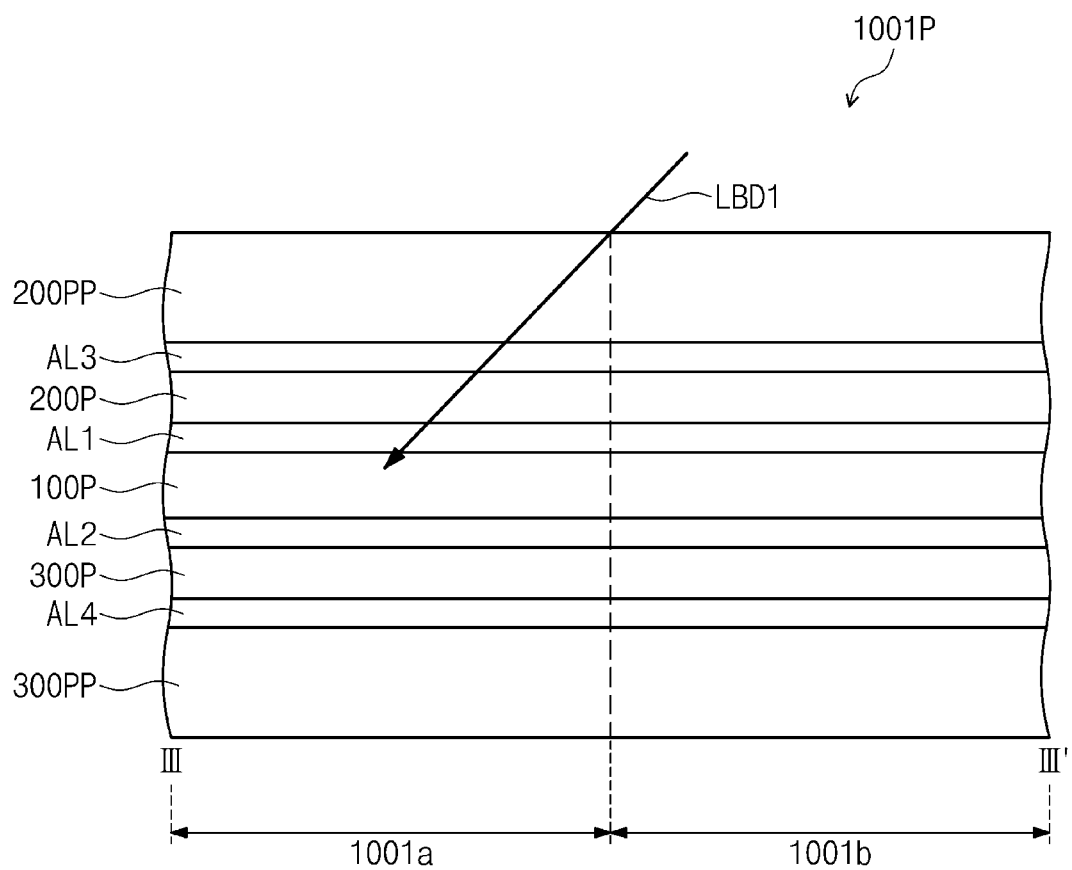
FIG. 12A and FIG. 12B are schematic views illustrating a method for manufacturing a display module according to an embodiment of the disclosure.
Figure 12B:
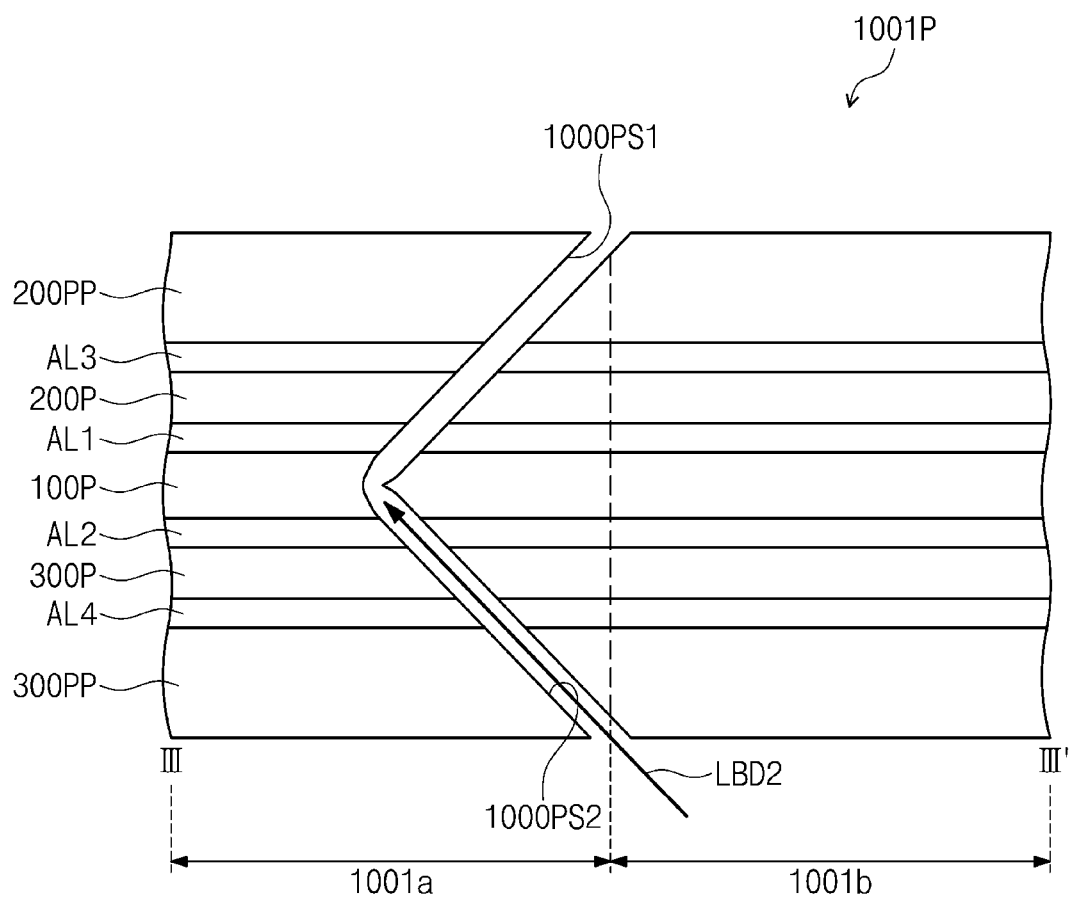

FIGS. 12A and 12B are schematic views illustrating a method for manufacturing a display module according to an embodiment.

Referring to FIGS. 12A and 12B, a first laser beam LBD1 is irradiated in the thickness direction of the preliminary display module 1001P, for example, in a direction inclined with respect to the third direction DR3. The first laser beam LBD1 may be irradiated in a direction towards the display panel 100P from the first protective film 200PP. A portion of the preliminary display module 1001P in the thickness direction may be cut by the first laser beam LBD1 to form a first preliminary side surface 1000PS1.

Then, a second laser beam LBD2 is irradiated in a direction inclined with respect to the thickness direction of the preliminary display module 1001P. The second laser beam LBD2 may be irradiated in a direction toward the display panel 100P from a second protective film 300PP. A portion of the preliminary display module 1001P in the thickness direction may be cut to form a second preliminary side surface 1000PS2.

Figure 13:
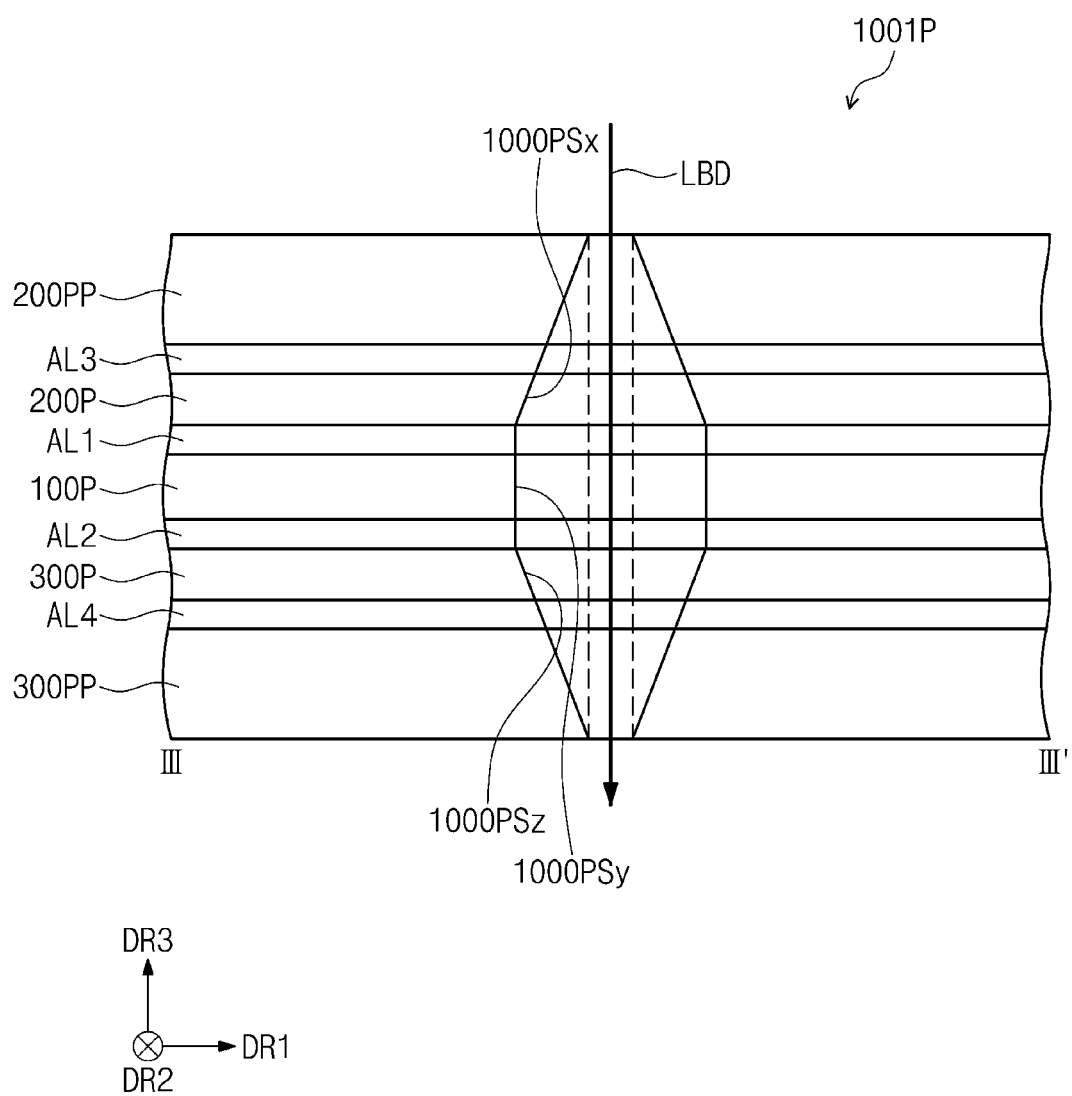
FIG. 13 is a schematic view illustrating a method for manufacturing a display module according to an embodiment of the disclosure.

FIG. 13 is a schematic view illustrating a method for manufacturing a display module according to an embodiment.

Referring to FIG. 13, forming first to third preliminary side surfaces 1000PSx, 1000PSy, and 1000PSz in the preliminary display module 1001P may proceed through the same process. The first preliminary side surface 1000PSx may be defined as the side surface of the first film 200P, the second preliminary side surface 1000PSy may be defined as the side surface of the display panel 100P, and the third preliminary side surface 1000PSz may be defined as the side surface of the second film 300P.

For example, at least one of the first protective film 200PP or the first film 200P may include a material that defocuses a focal point of the laser beam LBD, and either of the second film 300P or the second protective film 300PP may include a material that focuses the focal point of the laser beam LBD. Thus, even in case that the laser beam LBD is irradiated in a direction parallel to the thickness direction of the display module 1001, the focal point of the laser beam LBD may be defocused and focused to form the first film 200P and the third film 300P which have side surfaces protruding more than the side surface of the display panel 100P.

According to the abovementioned description, since an external impact is primarily absorbed by a first film or a second film protruding more than a display panel, a probability that an external impact is directly transmitted to a display device may be lowered. For example, the display panel may have a structure that is robust against an external impact, and a phenomenon, in which a defective pixel area visually recognized as a dark spot is gradually expanded, may be reduced or prevented.

Although the above has been described with reference to embodiments of the disclosure, those skilled in the art or those of ordinary skill in the relevant technical field will not depart from the spirit and scope of the disclosure described in the claims to be described below. It will be appreciated that various modifications and changes can be made to the disclosure within the scope of the disclosure. Accordingly, the technical scope of the disclosure should not be limited to the contents described in the detailed description of the specification.

What is claimed is:

1. A display module comprising:
a display panel comprising a first side surface;
a first film disposed on the display panel, and including a second side surface;
a second film disposed under the display panel, and including a third side surface;
a first adhesive layer disposed between the display panel and the first film; and
a second adhesive layer disposed between the display panel and the second film, wherein
the first side surface is a first portion of an outmost surface of the display panel, and
at least a portion of the second side surface and at least a portion of the third side surface protrude more to a side in a lateral direction than the first side surface.

2. The display module of claim 1, wherein the first side surface of the display panel, the second side surface of the first film, and the third side surface of the second film are disposed parallel to each other in a thickness direction of the display module.

3. The display module of claim 2, wherein a side surface of the first adhesive layer and a side surface of the second adhesive layer have a shape inclined with respect to the thickness direction of the display panel.

4. The display module of claim 1, wherein
the second side surface of the first film and a side surface of the first adhesive layer are connected to each other, and
the third side surface of the second film and a side surface of the second adhesive layer are connected to each other.

5. The display module of claim 1, wherein a maximum width between the first side surface of the display panel and the second side surface of the first film is at least about ¼ times a thickness of the display panel, in a plan view.

6. The display module of claim 1, wherein an entire side surface of the display panel overlaps the second film and is overlapped by the first film, in a plan view.

7. The display module of claim 1, wherein the display panel further comprises a side surface spaced apart from the first side surface, the side surface is a second portion of the outmost surface of the display panel, and
the side surface is aligned with the second side surface and the third side surface.

8. The display module of claim 1, wherein
an inclination of the second side surface of the first film with respect to the first side surface of the display panel is constant, and
an inclination of the third side surface of the second film with respect to the first side surface of the display panel is constant.

9. The display module of claim 1, wherein
an inclination of the second side surface of the first film with respect to the first side surface of the display panel varies depending on a position in the second side surface, and
an inclination of the third side surface of the second film with respect to the first side surface of the display panel varies depending on a position in the third side surface.

10. A display module comprising:
a display panel including a first side surface;
a first film disposed on the display panel, and including a second side surface; and
a second film disposed under the display panel, and including a third side surface, wherein
at least one of the second side surface of the first film and the third side surface of the second film protrudes more by a protruding width than the first side surface of the display panel, and
the protruding width is about ¼ to about 3 times a thickness of the display panel.

11. The display module of claim 10, further comprising:
a first adhesive layer disposed between the display panel and the first film; and
a second adhesive layer disposed between the display panel and the second film, wherein
the first side surface of the display panel, the second side surface of the first film, and the third side surface of the second film are parallel to each other in a thickness direction of the display panel, and
a side surface of the first adhesive layer and a side surface of the second adhesive layer each have a shape inclined with respect to the thickness direction of the display panel.

12. The display module of claim 10, wherein an entire side surface of the display panel overlaps the second film and is overlapped by the first film, in a plan view.

13. The display module of claim 10, wherein the display panel further comprises a side surface spaced apart from the first side surface,
each of the first side surface and the side surface is an outmost surface of the display panel,
the first side surface is more protruding than each of the second and third side surfaces, and
the side surface is aligned with the second side surface and the third side surface.

14. The display module of claim 1, wherein
the display panel includes an active area and a peripheral area surrounding the active area, and
the display panel further includes a driving circuit disposed in the peripheral area to drive the active area.

15. The display module of claim 1, wherein the third surface of the second film protrudes laterally from the first side surface of the display panel by a distance in a range of about 0.25 to about 3.0 times a thickness of the display panel.

16. The display module of claim 10, wherein the first side surface is an outmost surface of the display panel.

* * * * *